United States Patent Office 2,857,368
Patented Oct. 21, 1958

2,857,368

PROCESS FOR THE POLYMERIZATION OF RESINS FOR USE IN PASTE-LIKE DISPERSIONS

Robert B. Ingraham, Midland, and Glen L. Gunderman, Clare, Mich., assignors to The Dow Chemical Company, Midland, Mich., a corporation of Delaware No Drawing. Application March 26, 1956
Serial No. 573,639

3 Claims. (Cl. 260—92.8)

This invention relates to an improved process for the production of polymers in a particulate form of a size and shape suitable for use in paste-like dispersions, such as plastisols, organosols, hydrosols, and the like. More particularly it relates to such a process for producing polyvinyl chloride particles which are more readily dewatered than has been heretofore possible.

In the copending application of one of the present co-inventors Serial No. 563,041, filed February 6, 1956, is described a process for polymerizing vinyl chloride in a form from which polyvinyl chloride particles of certain sizes and shapes may be readily obtained. Those particles were suitable for use without further shaping and sizing in paste-like dispersions, such as plastisols, organosols, and hydrosols. The preparation disclosed in that application involves the polymerization of vinyl chloride monomer in aqueous dispersion in the presence of a water-soluble polymerization catalyst and certain water-dispersible or water-soluble agents which lower interfacial tension during polymerization but do not emulsify the monomer. Examples of such agents include hexaethylene glycol monolaurate, certain salts of ethylene diamine tetraacetic acid or of nitrilo triacetic acid, and glycols. The product resulting from that process was a friable aggregate of polyvinylchloride particles of spherical form and of a size useful directly in paste-like dispersions. The spherical particles were easily isolated in undistorted form by simple separation of the aggregate. That process represented a considerable advance in the paste-like dispersion art in that the particulate size and shape were determined during polymerization. In the processes prior to that time the polymer was produced in any size particles and shaped and sized for use in plastisols following polymerization by crushing or grinding large particles. The process disclosed in the above identified application has the disadvantage of resulting in a dispersion which is difficult to filter or to dewater. In the ordinary basket centrifuges the polymer retained as high as 100 percent water, based on the weight of polymer. It would therefore be desirable if that process could be improved to produce a readily dewaterable product. Those processes for polymerizing vinyl chloride which use oil-soluble catalysts, such as benzoyl or lauroyl peroxides, give a product which is easily freed from water, but they have the disadvantage of leaving catalyst residues in the polymer, and these adversely affect the stability of the polymer.

It is accordingly the principal object of this invention to provide an improved process for polymerizing vinyl chloride.

It is a further object to provide such a process to produce polyvinyl chloride in friable aggregates from which spheres of polyvinyl chloride of a size useful in preparing paste-like dispersions may be easily isolated.

It is a still further object to provide such a process for producing polyvinyl chloride in friable aggregate form which may be easily dewatered.

The above and related objects are accomplished by means of a process wherein vinyl chloride monomer is dispersed in an aqueous medium comprising a water-soluble polymerization catalyst, and trace amounts of a water soluble high molecular weight polymer of acrylamide, subjecting the so-formed dispersion to conditions known to cause polymerization, and following completion of polymerization dewatering the polyvinyl chloride by known means, such as filtration or centrifuging. This process permits much faster and easier dewatering than any prior known method.

Although the invention will be described using vinyl chloride alone, it is possible to employ any monomer or comonomers polymerizable under the conditions of this invention to produce water-insoluble polymers and copolymers. It is preferred, however, to use vinyl chloride alone or a monomeric material consisting predominantly of vinyl chloride with minor amounts of a monoethylenically unsaturated comonomer, such as vinyl acetate or acrylonitrile.

It is necessary to use water-soluble catalysts in the polymerization procedure of this invention. The amount of catalyst used will vary according to the rate of polymerization desired and other well-known variables, but is preferably used in a concentration of 0.1 to 5.0 percent of the weight of the monomer. A preferred catalyst for use in this process is potassium persulfate.

It is preferred to carry out the polymerization in the presence of an inert atmosphere, such as nitrogen, so as to obtain more uniform and faster rates of polymerization. Also, in many cases, a more stable polymer results. A common and convenient practice when volatile monomers are used is to flush the polymerization system with volatile monomer to exclude the air and to follow that flushing with a nitrogen or other inert gas purge.

The dispersion is preferably agitated during polymerization to cause dispersion of the monomer phase into discrete droplets and also to attain more efficient heat transfer throughout the system. Although agitation has little effect on the final particle size of the polymer except as that size is determined by the initial dispersion, it has nevertheless been found that very high rates of agitation provide sufficient shearing forces to break up the aggregates prematurely before the dewatering and other post polymerization handling operations can be carried out. When agitation is discontinued after the monomer has been dispersed, but before polymerization has proceeded past the sticky state, the aggregates are formed, but the spheres are cemented more rigidly together.

Although the polymerization may be carried to any conversion, it is preferred to polymerize to between from 70 to 90 percent conversion of monomer to polymer. Above 90 percent conversion, the aggregates tend to be more rigidly stuck together and the rate of polymerization is so slow as to be economically less desirable. Below 70 percent conversion the process becomes impractical economically.

Although any of the temperatures of polymerization that are commonly employed in free-radical polymerizations may be used, it has been found that the temperature of polymerization has a minor but significant effect on the friability of the aggregates. With increasing temperature the ease of separation of the aggregates into the individual spheres decreases. It is therefore preferred to carry out the polymerization at a temperature of 45° C. or lower.

When it is desired to obtain the polymer in the form of the friable aggregates of spheres, it has been found suitable to incorporate into the polymerization recipe amounts of certain water-dispersible or water-soluble surface tension reducing agents. These agents are typified by hexaethylene glycol monolaurate, sucrose, fructose, sucrose actaacetate, the water-soluble salts of ethylene diamine tetra-acetic acid, the water-soluble salts of nitrilo triacetic acid, gluconic acid, mannitol, glycerine, and ammonium gluconate. The useful agents are all organic compounds with several water-solubilizing groups, such as OH or COOH. The suitable agents are such poor emulsifiers and dispersants for the monomer being polymerized that they will neither maintain the monomer in dispersion nor produce a latex-like product requiring coagulation to isolate the polymer. Active solvents or softeners for polyvinyl chloride or for the copolymer being produced cannot be employed to obtain the present result. The agents may be employed usefully in a concentration of from 0.05 to 15 percent of the weight of the monomer used. Greater amounts may leave residues which will adversely affect the properties of plastisols produced from the polymer.

To facilitate the dewatering of the polymerized product there is added to the polymerization recipe a small amount of water-soluble, high-molecular weight polymer of acrylamide, hereinafter referred to as polyacrylamide. The polyacrylamide is employed in a concentration of from 0.002 to 0.05 percent by weight based on the weight of the monomer. When less than 0.002 weight percent is used there is no noticeable improvement in dewatering ease and when significantly more than 0.05 weight percent is used the polymer is formed in large lumps. The polymerizations that are conducted without any polyacrylamide result in a product that is slime-like in its resistance to dewatering. Such products clog filters and cannot be dewatered in basket centrifuges and other similar equipment. The polymerizations employing polyacrylamide in accordance with this invention, however, result in a granular product which is readily dewatered in basket centrifuges and may be easily filtered.

The expression "high molecular weight polymer of acrylamide," as employed in the present specification and claims, refers to a polyacrylamide product substantially free of cross-linking and characterized by a viscosity of at least 1.0 centipoise, as measured with an Ostwald viscometer on a 0.5 percent by weight solution of polymer in distilled water adjusted to a pH of 3 to 3.5 and at a temperature of 25° C. It is inclusive of the homopolymer of acrylamide, and also of copolymers of acrylamide, with up to about 15 percent by weight of other suitable monomers such as acrylic acid, alkyl esters of acrylic acid and methacrylic acid, methacrylamide, styrene, vinyl acetate, acrylonitrile, methacrylonitrile, vinyl alkyl ethers, vinyl and vinylidene chloride, and the like, provided that each such polymeric material be characterized by water solubility, freedom from cross-linking, and the indicated minimum viscosity.

Water-soluble polymers of acrylamide are subject to some hydrolysis, i. e. they may contain some free carboxyl groups. This condition is dependent upon the method of manufacture of the polymer, the presence or absence of small amounts of acrylic acid in the starting monomer, and conditions of storage of the polymer. The polymer products appear to be equivalent in the process of this invention whether the carboxyl groups result from the copolymerization of acrylamide with acrylic acid or from hydrolysis subsequent to polymerization. In the practice of the present invention the operable polymers within the above defined limitations are those having not more than 15 percent of the theoretically possible carboxyl groups.

In the preparation of aqueous solutions of the high molecular weight polymers of acrylamide, the polymer is mixed with water and agitated vigorously, conveniently at room temperature. In such operations, the polymer may be employed in flake or powdered form or the highly viscous concentrated aqueous compositions obtained by polymerization of acrylamide in water may be used directly. In practice it is frequently desirable to employ a concentrate consisting of an aqueous solution containing from 1 to 5 percent by weight of the polymer and to dilute this concentrate as needed. In the preparation of such concentrates it is preferred to employ water containing a minimum of polyvalent metal ions, such as ferric or aluminum ions, since such ions may render the concentrates gel-like and difficult to handle. In general, the choice of concentration of acrylamide polymer for use in aqueous concentrates will depend upon the viscosity of the polymer.

The acrylamide polymers herein disclosed are useful within the pH range of 1 to 11.5 and accordingly are satisfactory in the normally acidic media of polymerization used with vinyl chloride.

The vinyl chloride polymer produced by this process is in the form of friable aggregates of a size ranging from 25 microns to 2.0 centimeters in diameter, composed of individual spheres of polymer having diameters of from 0.3 to 2.0 microns. The individual spheres are easily isolated from the aggregates by simple comminution. The individual spherical particles forming each aggregate are held to one another with sufficient tenacity to allow normal handling without disintegration of the aggregate. The individual particles do not cohere to one another through inter-particulate fusion as might be the case if individual spherical polymer particles were thermally fused together to form a single integral porous polymer particle. The separation of such an integral particle would require the fracture of a weld between the individual particles giving a rough surface at the point of fracture which would affect the properties of a subsequently prepared polymer dispersion.

Neither are the aggregates glued or held together with a foreign adhesive. The separation of such aggregates could be easily accomplished but the foreign adhesives would contaminate the product if left on the particles, or would have to be removed by a separate washing and drying operation.

The easily dewatered friable aggregates are formed during polymerization and are not produced by any post-polymerization procedure.

By way of example and not of limitation, a polymerization vessel was charged with an aqueous phase consisting of 1100 parts by weight of water, 0.008 part by weight of a water soluble polyacrylamide, and 0.5 part by weight of ethylene diamine tetra-acetic acid. The system was purged with vinyl chloride vapor and nitrogen gas, and finally 400 parts by weight of vinyl chloride and 0.5 part of potassium persulfate were added. The dispersion was agitated for five minutes and 0.1 part by weight of potassium meta bisulfite was added. Polymerization was initiated by warming the dispersion to 40° C. and maintained under agitation until the conversion had reached 85 percent. The resulting polymer dispersion was dewatered to 20 percent water in a basket centrifuge. After drying, the polymer was found to be in the form of aggregates of diameters ranging from 25 microns to 1.5 centimeters of spheres having individual diameters of from 0.3 to 2.0 microns. The spheres were isolated in undistorted and unfractured form from the aggregates by simple and light grinding.

In a similar manner, whenever polyacrylamide was present in the described proportions, easily-dewaterable friable aggregates of polyvinyl chloride were prepared using hexaethylene glycol monolaurate, sucrose, fructose, sucrose octaacetate, ethylene diamine tetra-acetic acid-ammonium salt, ammonium nitrilo-triacetate, gluconic acid, mannitol, glycerine, and ammonium gluconate as the surface-tension reducers in place of the ethylene diamine tetra-acetic acid.

By way of contrast when the polyacrylamide was omitted from the above recipe, the polymer following polymerization was in the form of a slime that clogged the filters. When it was attempted to centrifuge the slime, the water content was lowered to only 95 percent, based on the weight of polyvinyl chloride.

We claim:
1. In a process for preparing polyvinyl chloride suitable for use in paste resin dispersions in a form capable of easy dewatering comprising the sequential steps of dispersing vinyl chloride as the sole monomeric material into an aqueous phase containing a water-soluble polymerization catalyst, subjecting said dispersion to agitation at a polymerization temperature of not more than 45° C., and allowing polymerization to proceed to from 70 to 90 percent conversion, the improvement consisting in adding to said dispersion prior to polymerization from 0.002 to 0.05 percent by weight based on the weight of said monomer of a water soluble, high molecular weight polymer of acrylamide.

2. The process claimed in claim 1 wherein said water-soluble catalyst is an inorganic persulfate.

3. The process claimed in claim 1 wherein said polymer of acrylamide is polyacrylamide whose 0.5 percent solution in acidulated water at pH to 3.5 at 25° C. has a viscosity of at least 1 centipoise.

References Cited in the file of this patent
UNITED STATES PATENTS

| | | |
|---|---|---|
| 2,067,234 | Gordon et al. | Jan. 12, 1937 |
| 2,133,257 | Strain | Oct. 11, 1938 |
| 2,580,277 | Boyd | Dec. 25, 1951 |

UNITED STATES PATENT OFFICE
CERTIFICATE OF CORRECTION

Patent No. 2,857,368                                October 21, 1958

Robert B. Ingraham et al.

It is hereby certified that error appears in the printed specification of the above numbered patent requiring correction and that the said Letters Patent should read as corrected below.

Column 6, line 5, for "pH to" read -- pH 3 to --.

Signed and sealed this 17th day of March 1959.

(SEAL)
Attest:

L H. AXLINE
Attesting Officer

ROBERT C. WATSON
Commissioner of Patents